April 17, 1962 T. B. REED 3,030,490
MULTIPLE PURPOSE ARC TORCH APPARATUS
Filed Dec. 18, 1959

INVENTOR.
THOMAS B. REED
BY Richard S. Shreve Jr.
ATTORNEY

United States Patent Office 3,030,490
Patented Apr. 17, 1962

3,030,490
MULTIPLE PURPOSE ARC TORCH APPARATUS
Thomas B. Reed, Danville, Ind., assignor to Union Carbide Corporation, a corporation of New York
Filed Dec. 18, 1959, Ser. No. 860,499
4 Claims. (Cl. 219—75)

This invention relates to arc torches and more particularly to torches of this character for carrying out the processes of Gage Patents Nos. 2,806,124 and 2,858,411.

Torches for achieving wall stabilized or constricted arc operation wherein a portion of the arc is surrounded in close proximity with a solid nozzle require good alignment of the stick electrode and the nozzle in order to prolong the useful nozzle life. Secondly, the nozzle requires adequate cooling to prevent damage at the arc temperatures. These features become especially important in non-transferred arc operation wherein the arc is maintained between a stick electrode and a nozzle electrode. Some prior arc torch apparatus have also failed due to magnetic deflection of the arc created by asymmetric current paths causing off-axis nozzle wear.

It is, therefore, the main object of the present invention to provide an arc torch having proper alignment between the stick electrode and the nozzle passage. Other objects are to provide an arc torch which has adequate cooling of the nozzle, which eliminates off-axis nozzle wear caused by magnetic arc deflection, which is easily dismantled for maintenance and repair, and which is also useful for non-wall stabilized arc operation.

The arc torch of the present invention in its broadest aspects comprises a torch body; an electrode supporting means positioned coaxially within the torch body and forming a first annular cooling medium passage therebetween; a torch casing positioned coaxially around the torch body and forming a second annular cooling medium passage therebetween which communicates with the first annular cooling passage; an insulator positioned coaxially against the lower end of the electrode supporting means with interlocking means for maintaining the coaxial relation; a gas directing nozzle with a central nozzle passage positioned coaxially against the lower end of the insulator with interlocking means for maintaining the coaxial relation, such interlocking means between the electrode supporting means, insulator and nozzle maintains the axial alignment between the electrode and the nozzle passage; and gas passage means extending to the nozzle.

Figure 1:
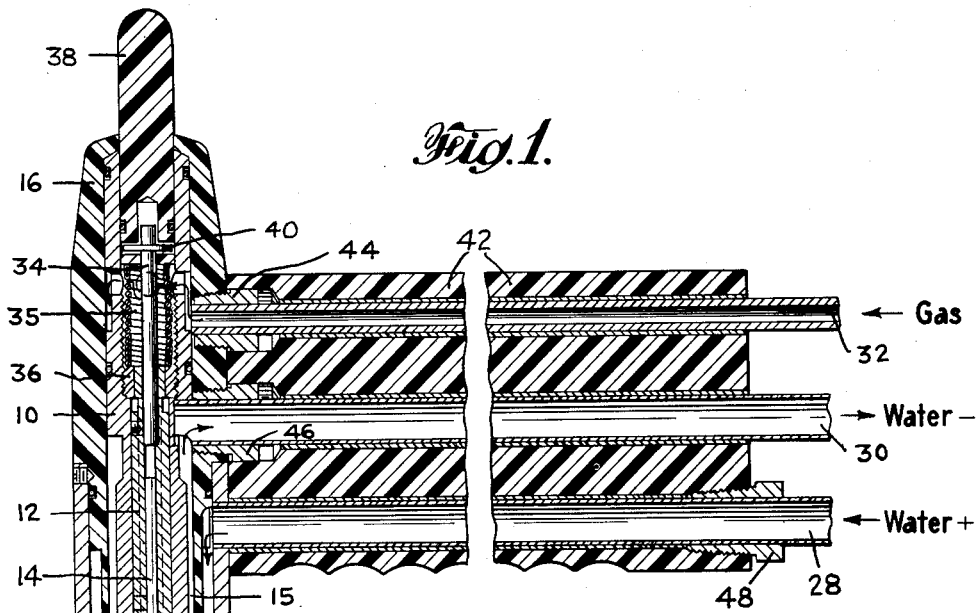
FIG. 1 is a cross section through an arc torch according to the preferred embodiment of the present invention.

The torch shown in FIG. 1 has a body provided with electrode supporting means positioned coaxially therein comprising a metal barrel 10 having a bore which receives an electrode holder 12 for a stick electrode 14, preferably of tungsten. The upper part of the barrel forms the torch head, which is encased in a sheath or torch body 16 of electrical insulation such as a plastic resin preferably "nylon" molded or otherwise formed with a bore in which the top of the barrel is slideably sealed. The lower part of the barrel 10 is annularly grooved and reduced in diameter to form with the sheath or torch body 16 an inner annular cooling passage 15.

A gas directing nozzle 18 having a central orifice or nozzle passage 19 is mounted below and coaxial with the lower part of the barrel 10 and insulated therefrom by a sleeve 20 of plastic resin, preferably "Teflon." The top of the sleeve 20 is annularly grooved and has an upper peripheral flange 21 to receive the bottom of the barrel 10 which has an annular ridge to fit snugly therein. The bottom of the sleeve 20 has an annular ridge 23 to fit snugly in an annular groove in the top of the nozzle 18. This interlocking relation of the barrel, sleeve and nozzle maintains the coaxial disposition thereof.

Positive centering of the electrode 14 with respect to the central orifice 19 of the nozzle 18 is easily obtained by the interlocking means between the barrel 10, insulator sleeve 20 and nozzle 18. Preferably V-grooves and corresponding extensions are used for the interlocking means. In this manner, the distance from the electrode holder-electrode guide tube combination to the nozzle passage is kept as small as possible, and centering to within 0.010 inch has been achieved without requiring expensive and inconvenient tolerances in machining the parts.

The outside of the lower part of the insulating sheath or torch body is shouldered and reduced in diameter to form a depending cylindrical skirt or baffle 24 extending down over the bottom of barrel 10, sleeve 20 and the upper part of the nozzle 18, but spaced therefrom to form the inner annular cooling passage 15. A casing 25 is secured to the shoulder of the sheath or torch body 16, and a cap 26 threaded on the bottom of the casing 25 engages the bottom of the nozzle 18 in sealing relation to form with the casing 25 an outer cooling passage 27. Cap 26 also forms an electrical contact between the casing 25 and the nozzle 18.

Cooling medium, such as water, enters the torch through line 28 which communicates with annular space 27. The cooling medium then passes at high velocity up through annular passage 15 and exits through line 30. It has been found that adequate nozzle cooling depends on high velocity cooling medium flow and a high pressure drop at the nozzle. This is conveniently obtained by having the nozzle portion of annular passage 15 be about 1/64 inch wide. With a cooling water flow of about 3 g.p.m., this produces an adequate velocity of about 24 f.p.s. along the nozzle wall.

In order to attain the highest power levels in a torch of this type without nozzle failure, it is necessary under non-transferred arc operation wherein the arc is struck between the inner stick electrode and the nozzle electrode that heat equivalent to about 12 k.w./sq. in. of nozzle area be removed continuously from the nozzle. A preferred method of accomplishing this in combination with high cooling medium flow is to utilize fairly thick nozzle walls. This results in increased outer surface area with only slight increase in the temperature drop through the walls.

An optimum nozzle design must therefore be used considering both total heat transfer and temperature drop. With copper nozzles, an O.D. of about 21/32 inch is sufficient to remove about 8 kw. of total heat from a 1/16 inch I.D. nozzle passage. This particular cooling passage arrangement also conveniently cools torch casing 25 and cap 26. During some welding tests, the cap was dragged through molten metal with no damage except some slight discoloration. This indicates the advance in the art of torch body cooling produced by the present invention wherein the coaxial relation of the cooling passages provides cooling to substantially the entire torch casing and nozzle cap as well as cooling the torch nozzle and electrode holder.

Electrical power is conveniently supplied to the apparatus through lines 30 and 28. Line 28 is connected to the torch casing 25 which in turn makes electrical connection to nozzle 18 through cap 26. Line 30 is connected to electrode barrel 10 which in turn makes electrical connection to electrode 14 through electrode holder 12. The concentric tubular relation between the separate electrode connections inside the torch itself tends to eliminate any asymmetric magnetic fields which might tend to deflect the arc originating from the electrode 14 and produce off-center wear in nozzle passage 19.

Torch gas for maintaining the arc and shielding the work material enters the apparatus through line 32, passes down through passages in or around the electrode supporting means and then passes out through nozzle passage 19. This gas may be any arc-supporting gas, but it is preferably hydrogen for obtaining the highest arc flame heat intensity.

When the nozzle 18 is a primary electrode for non-transferred arc operation or when it is a secondary or pilot electrode for transferred arc operation, the arc between electrode 14 and the nozzle can be inititated by bringing electrode 14 into arcing relation with nozzle 18 and then retracting the electrode to desired arc length once the arc is initiated. These operations can be conveniently carried out by the preferred embodiment shown in FIG. 1. An electrode push rod 34 conveniently having a square cross-section is attached to electrode holder 12. This push rod passes up through the center of electrode stop 36 which is threadably attached to the inner diameter of electrode barrel 10. The upper end of push rod 34 is attached to an insulated push buttom 38 by means of a pin 40. A retract spring 35 surrounds push rod 34 and extends between electrode stop 36 and push-start button 38. When button 38 is pushed down, it lowers the rod 34 which in turn lowers electrode holder 12 and electrode 14 into arcing relation with nozzle 18. Release of pressure on button 38 will allow the electrode to retract. The final position of electrode 14 is thus determined by the position of electrode stop 36. Its position is changed by rotating button 38 and rod 34 which in turn rotates stop 36 and either raises or lowers it. These features of push-start and means for changing the internal arc length are disclosed and claimed in my U.S. Patent No. 2,898,441, issued jointly with M. T. Smith, Jr.

The service lines 32, 30 and 28 providing gas, electric power and cooling medium are conveniently and preferably conducted to the apparatus in a parallel fashion and contained within insulating handle 42. Leak-tight connections are provided by jam nuts 44, 46 and 48.

This apparatus can be conveniently dismantled for maintenance and repair by loosening jam nuts 46 and 48 enabling the handle 42 and line 30 to be withdrawn. Removal of cap 26 then allows the remainder of the apparatus to be withdrawn from the torch body 16 and torch casing 25.

Safety of the operator has been provided by shielding the high voltage for electrode 14 from external contact by means of handle 42 and insulated body 16 and push-start button 38. The nozzle electrode and casing on non-transferred arc operation can be at ground potential and normally requires no special shielding.

This torch is especially useful with hydrogen gas for non-transferred operation. A jet of atomic hydrogen is obtained which can be employed for welding, cutting or other thermal material-working processes. While sonic velocity hydrogen flow in a non-transferred arc torch is disclosed in U.S. Patent No. 2,874,265, the present torch can also be conveniently used for lower velocity "laminar" jet production. This quiet and relatively non-luminous jet extends from about 6 to 12 inches from the torch and contains a core of atomic hydrogen which is extremely effective for transferring heat and which will melt zirconia having a melting point of 3000° K.

It should be pointed out that gas flow through the torch helps cool the nozzle, and an adequate gas flow is absolutely necessary to prevent nozzle burn out during operation. While it is understood that different size nozzle passages will require different gas flows in order to obtain laminar or turbulent gas flow, a 3/32 inch passage, for example, can produce a laminar hydrogen jet with from 5 to about 30 c.f.h.

Figure 2:
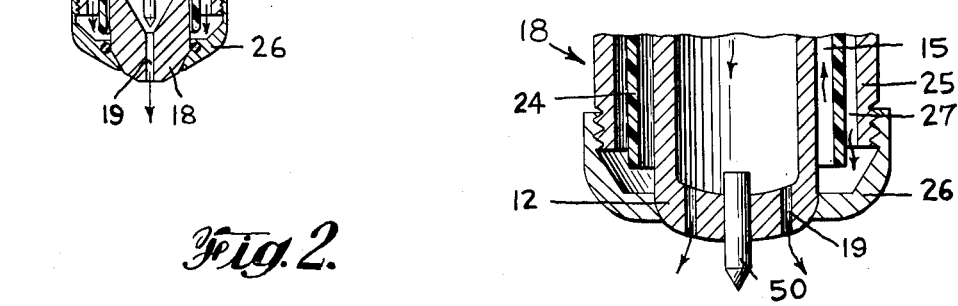
FIG. 2 is a partial cross section of a modification for use in low gas velocity arc welding.

Non-transferred arc operation with the present novel apparatus does provide a widely useful tool in the metal working industry. For cutting materials, it has the advantage of operating at a fixed voltage independent of metal thickness since the nozzle is the fixed anode. It is quite suitable for hand operation in that no fixed torch-to-work distance need be maintained. Since the arc is self-contained within the apparatus, extremely dark goggles need not be worn by the operator as are necessary with prior equipment using external arcs. This particular equipment is also quite versatile. In addition to being used to carry out the processes of U.S. 2,806,124 and 2,858,411, it can with slight apparatus variation, be used with other prior art processes. FIG. 2 shows an apparatus variation useful with low gas velocity transferred arc welding wherein a larger diameter nozzle has been substituted for the narrow nozzle of FIG. 1. This apparatus variation can be used with "Heliarc" type welding. The nozzle 18 could be a secondary electrode or could be out of the circuit as desired.

Figure 3:
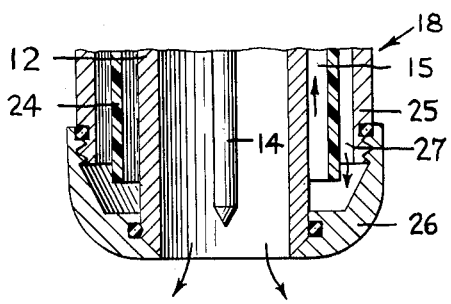
FIG. 3 is a partial cross section of a further modification for use in direct current reverse polarity operation.

Reverse polarity welding can also be achieved with the present apparatus. FIG. 3 shows one apparatus variation useful for reverse polarity operation. The modified nozzle 18 contains a central refractory metal electrode insert 50, such as tungsten or molybdenum, surrounded by a plurality of nozzle passages 19. The gas jets produced by the nozzle passages tend to stabilize the arc at the electrode insert. The excellent water cooling on the nozzle enables the refractory metal electrode insert to be conveniently used as an anode at currents at least as high as 200 amperes. It is understood that a modification of nozzle 18 similar to that shown in FIG. 1 without the tungsten insert might also be useful for reverse polarity operation with the work as the cathode.

In summary, this novel apparatus has the advantages of: automatic centering of the cathode with respect to the nozzle passage due to the sandwich construction of the cathode-anode assembly; high velocity annular cooling of the nozzle anode and cathode support means capable of dissipating greater than 8 kw. at the nozzle; concentric cooling medium passages giving high flows with small torch diameter and simplified manufacture; well-cooled outer body; concentric current path which may help eliminate off-axis nozzle wear; push-start means, eliminating high-frequency starting means and allowing accurate set-back control during operation; interchangeable nozzles for cutting, welding and reverse polarity operation.

It can thus be seen that this improved apparatus can be widely used in a variety of applications. This torch with an assortment of different nozzle shapes and sizes could provide a multiple purpose tool especially for the small job shop since it can be used for transferred and non-transferred arc welding, cutting, heat treating and hard facing with both direct current straight and reverse polarity. The combination of this torch and the power supply described in copending application Serial No. 819,956, filed on June 12, 1959, should provide an extremely versatile and portable outfit.

The following examples show typical use of the present equipment.

EXAMPLE I

Arc Torch Cutting

Equipment of the type shown in FIG. 1 was used. An arc of 109 volts (DCSP) and 180 amperes was maintained between a 1/8 inch diameter thoriated tungsten stick electrode and a nozzle electrode having a nozzle passage 1/16 inch diameter and 9/16 inch long. Hydrogen gas at 130 c.f.h. passed around the stick electrode and out through the nozzle passage. The resulting high velocity jet of atomic hydrogen was used to cut 1 1/16 inches thick stainless at 8 inches per minute.

EXAMPLE II

Arc Torch Melting

Equipment of the type described in Example I above was used. A non-transferred arc of 70 volts (DCSP) and 80 amperes was operated with hydrogen gas flow of 17 c.f.h. through the 7/64 in. dia. nozzle. The resulting low velocity laminar jet of atomic hydrogen was used for hand welding 1/8 inch thick stainless steel at 12 inches per minute in a manner similar to that of an oxy-acetylene torch. No porosity was observed.

EXAMPLE III

Reverse Polarity Welding of Aluminum

Equipment of the type shown in FIG. 3 was used. An arc of 150 amperes was maintaind between a 1/4 inch diameter tungsten anode inserted in a water cooled torch nozzle and a 1/8 inch thick aluminum workpiece cathode. Several small jets of argon gas having total gas flow of about 10 c.f.h. surrounded the tungsten anode and tended to stabilize the arc at the anode. Additional shielding of 20 c.f.h. of argon gas was introduced around the torch. A very satisfactory clean weld bead was thus obtained on the aluminum workpiece.

What is claimed is:

1. Gas-shielded arc torch comprising a torch body, electrode supporting means positioned coaxially within said torch body and forming therewith a first annular cooling passage therebetween, means for supplying electric current to an electrode supported by said means, a torch casing positioned coaxially around said torch body and forming a second annular cooling passage communicating with said first cooling passage, means for supplying cooling medium to said cooling passages, an insulator positioned coaxially against the lower end of said electrode supporting means in interlocking engagement therewith, a gas directing nozzle having a central orifice and positioned against the lower end of said insulator in interlocking engagement therewith, such interlocking engagements maintaining the coaxial alignment of said electrode supporting means, insulator and nozzle, and means for supplying gas to said nozzle.

2. Gas-shielded arc torch comprising a barrel, an electrode holder in said barrel, means for supplying electric current to an electrode in said holder, a gas directing nozzle mounted below said barrel, an insulator sleeve mounted between said barrel and nozzle in annularly interfitting relation therewith to maintain coaxial alignment of said barrel and nozzle, and means for supplying gas through said barrel and sleeve to said nozzle.

3. Gas-shielded arc torch comprising a barrel, an electrode holder in said barrel, means for supplying electric current to an electrode in said holder, an insulating sheath having an upper part surrounding the upper part of said barrel said insulating sheath having a lower part spaced from the lower part of said barrel to form therebetween a cooling passage, a casing surrounding the lower part of said insulating sheath to form therebetween a second cooling passage communicating below said sheath with said first cooling passage, a gas directing nozzle coaxial with said barrel, a cap secured to the bottom of said casing having a central aperture receiving said nozzle and connecting said cooling passages, means for supplying cooling medium to said passages, and means for supplying gas to said nozzle.

4. Gas-shielded arc torch comprising a barrel, an insulating sheath surrounding said barrel in slideably sealed relation, an electrode holder in said barrel, means for supplying electric current to an electrode in said holder, a gas directing nozzle below said barrel, a casing surrounding the lower part of said barrel and forming therewith cooling passage means, a cap secured to the bottom of said casing for supporting said gas directing nozzle, a lateral insulating handle joining said sheath, a supply line in said handle entering an aperture in said barrel, said supply line being removable through said handle to release said barrel and said cap being removable to allow the nozzle, electrode holder and barrel to be removed from the casing for maintenance and repair.

References Cited in the file of this patent

UNITED STATES PATENTS

| | | |
|---|---|---|
| 2,834,870 | Platte | May 13, 1958 |
| 2,898,441 | Reed et al. | Aug. 4, 1959 |
| 2,922,868 | Hackman | Jan. 26, 1960 |
| 2,938,106 | Hawthorne | May 24, 1960 |